US009332051B2

(12) United States Patent
Brueck et al.

(10) Patent No.: US 9,332,051 B2
(45) Date of Patent: May 3, 2016

(54) MEDIA MANIFEST FILE GENERATION FOR ADAPTIVE STREAMING COST MANAGEMENT

(71) Applicant: VERIZON PATENT AND LICENSING INC., Basking Ridge, NJ (US)

(72) Inventors: David F. Brueck, Saratoga Springs, UT (US); C. Ryan Owen, Riverton, UT (US); Tyler Bye, Lehi, UT (US); Nathan James Edwards, Orem, UT (US); Ken Brueck, Lehi, UT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 247 days.

(21) Appl. No.: 14/052,589

(22) Filed: Oct. 11, 2013

(65) Prior Publication Data

US 2014/0250230 A1 Sep. 4, 2014

Related U.S. Application Data

(60) Provisional application No. 61/712,657, filed on Oct. 11, 2012.

(51) Int. Cl.
*H04L 29/06* (2006.01)
*H04L 29/08* (2006.01)
*G06F 15/16* (2006.01)

(52) U.S. Cl.
CPC ............ *H04L 65/607* (2013.01); *H04L 65/608* (2013.01); *H04L 67/18* (2013.01)

(58) Field of Classification Search
CPC .................... H04N 21/8456; H04N 21/26258; H04N 21/84; H04N 21/235; H04N 21/8543; H04N 21/23439; H04N 21/4316; H04N 21/6582; H04N 21/8455; H04N 21/25891; H04N 21/2665; H04N 21/2365; H04N 21/44016; H04N 21/6581; H04N 21/23424; H04N 21/2402; H04N 21/2407; H04N 21/2408; H04N 21/25808; G06F 17/3002; G06F 17/30887
USPC ......... 709/231, 219, 217, 203, 227, 223, 224, 709/226, 228, 229, 232, 235; 715/721
See application file for complete search history.

(56) References Cited

U.S. PATENT DOCUMENTS 4,535,355 A 8/1985 Am et al.
5,953,506 A 9/1999 Kalra et al.

(Continued)

FOREIGN PATENT DOCUMENTS

CA 2466482 5/2003
EP 0711077 A2 5/1996

(Continued)

OTHER PUBLICATIONS

Wicker, Stephen B., "Error Control Systems for Digital Communication and Storage", Prentice-Hall, Inc., New Jersey, USA, 1995 (Book: see NPL's Parts 1-6).

(Continued)

*Primary Examiner* — Alina N Boutah (57) ABSTRACT

Methods and systems for adaptive streaming cost management are described. A processing device can receive a request over a network from a media player executing on a client device to adaptively stream media content. The media content can include a plurality of media slices. The processing device can identify a geographical location of the client device from the request. The processing device can generate a media manifest file based on the geographical location of the client device. The media manifest file can indicate one or more media sources at which a copy of the plurality of media slices is geographically located and a cost associated with delivery of the plurality of media slices from the respective one of the one or more media sources. The processing device can transmit the media manifest file to the client device over the network.

20 Claims, 7 Drawing Sheets

(56) References Cited

U.S. PATENT DOCUMENTS

| | | | |
|---|---|---|---|
| 6,091,775 A | 7/2000 | Hibi et al. | |
| 6,091,777 A | 7/2000 | Guetz et al. | |
| 6,195,680 B1 | 2/2001 | Goldszmidt et al. | |
| 6,243,761 B1 | 6/2001 | Mogul et al. | |
| 6,272,469 B1* | 8/2001 | Koritzinsky | A61B 5/0002 128/920 |
| 6,366,614 B1 | 4/2002 | Pian et al. | |
| 6,389,473 B1 | 5/2002 | Carmel et al. | |
| 6,486,803 B1 | 11/2002 | Luby et al. | |
| 6,490,627 B1 | 12/2002 | Kalra et al. | |
| 6,510,553 B1 | 1/2003 | Hazra | |
| 6,574,591 B1 | 6/2003 | Kleiman et al. | |
| 6,604,118 B2 | 8/2003 | Kleiman et al. | |
| 6,731,600 B1 | 5/2004 | Patel et al. | |
| 6,732,183 B1 | 5/2004 | Graham | |
| 6,763,392 B1 | 7/2004 | del Val et al. | |
| 6,968,387 B2 | 11/2005 | Lanphear | |
| 7,010,598 B2 | 3/2006 | Sitaraman et al. | |
| 7,075,986 B2 | 7/2006 | Girod et al. | |
| 7,096,271 B1 | 8/2006 | Omoigui et al. | |
| 7,295,520 B2 | 11/2007 | Lee et al. | |
| 7,349,976 B1 | 3/2008 | Glaser et al. | |
| 7,408,984 B2 | 8/2008 | Lu et al. | |
| 7,784,076 B2 | 8/2010 | Demircin et al. | |
| 7,962,637 B2 | 6/2011 | Su et al. | |
| 9,015,335 B1 | 4/2015 | Gigliotti et al. | |
| 9,112,948 B1 | 8/2015 | Wood et al. | |
| 2002/0004798 A1* | 1/2002 | Babula | G06F 19/3406 |
| 2002/0073167 A1 | 6/2002 | Powell et al. | |
| 2002/0144276 A1 | 10/2002 | Radford et al. | |
| 2002/0174434 A1 | 11/2002 | Lee et al. | |
| 2002/0188745 A1 | 12/2002 | Hughes et al. | |
| 2003/0005455 A1 | 1/2003 | Bowers | |
| 2003/0067872 A1 | 4/2003 | Harrell et al. | |
| 2003/0081582 A1 | 5/2003 | Jain et al. | |
| 2003/0107994 A1 | 6/2003 | Jacobs et al. | |
| 2003/0135631 A1 | 7/2003 | Li et al. | |
| 2003/0151753 A1 | 8/2003 | Li et al. | |
| 2003/0152036 A1 | 8/2003 | Quigg Brown et al. | |
| 2003/0204519 A1 | 10/2003 | Sirivara et al. | |
| 2004/0003101 A1 | 1/2004 | Roth et al. | |
| 2004/0030797 A1 | 2/2004 | Akinlar et al. | |
| 2004/0031054 A1 | 2/2004 | Dankworth et al. | |
| 2004/0054551 A1 | 3/2004 | Ausubel et al. | |
| 2004/0071209 A1 | 4/2004 | Burg et al. | |
| 2004/0093420 A1 | 5/2004 | Gamble | |
| 2004/0128386 A1 | 7/2004 | Oomoto et al. | |
| 2004/0140989 A1* | 7/2004 | Papageorge | 345/700 |
| 2004/0143672 A1 | 7/2004 | Padmanabham et al. | |
| 2004/0148313 A1* | 7/2004 | Lu | G09B 5/06 |
| 2004/0170392 A1 | 9/2004 | Lu et al. | |
| 2005/0108414 A1 | 5/2005 | Taylor et al. | |
| 2005/0123058 A1 | 6/2005 | Greenbaum et al. | |
| 2005/0262257 A1 | 11/2005 | Major et al. | |
| 2005/0276496 A1* | 12/2005 | Molgaard | H04N 19/105 382/244 |
| 2007/0024705 A1 | 2/2007 | Richter et al. | |
| 2008/0028428 A1 | 1/2008 | Jeong et al. | |
| 2008/0056373 A1 | 3/2008 | Newlin et al. | |
| 2008/0133744 A1 | 6/2008 | Ahn et al. | |
| 2008/0162713 A1 | 7/2008 | Bowra et al. | |
| 2008/0195744 A1 | 8/2008 | Bowra et al. | |
| 2008/0195745 A1 | 8/2008 | Bowra et al. | |
| 2009/0031384 A1 | 1/2009 | Brooks et al. | |
| 2009/0063574 A1* | 3/2009 | Kim | G06F 21/10 |
| 2010/0205618 A1* | 8/2010 | Gonzalez | G06F 8/61 719/328 |
| 2010/0303146 A1 | 12/2010 | Kamay | |
| 2010/0312828 A1* | 12/2010 | Besserglick | H04L 65/602 709/203 |
| 2011/0060812 A1 | 3/2011 | Middleton | |
| 2011/0314130 A1* | 12/2011 | Strasman | H04L 29/06 709/219 |
| 2012/0070129 A1* | 3/2012 | Lin et al. | 386/278 |
| 2012/0179833 A1* | 7/2012 | Kenrick et al. | 709/231 |
| 2012/0197419 A1* | 8/2012 | Dhruv et al. | 700/94 |
| 2013/0080579 A1* | 3/2013 | Gordon et al. | 709/217 |
| 2013/0111028 A1* | 5/2013 | Kondrad et al. | 709/225 |
| 2013/0291002 A1* | 10/2013 | Rothschild et al. | 725/25 |
| 2013/0311776 A1* | 11/2013 | Besehanic | 713/168 |
| 2013/0332559 A1* | 12/2013 | Mas Ivars et al. | 709/216 |
| 2013/0332916 A1* | 12/2013 | Chinn | G06F 8/65 717/169 |
| 2014/0040026 A1* | 2/2014 | Swaminathan et al. | 705/14.53 |
| 2014/0101118 A1* | 4/2014 | Dhanapal | 707/695 |
| 2014/0109164 A1* | 4/2014 | Yamagishi | 725/131 |
| 2014/0149557 A1* | 5/2014 | Lohmar et al. | 709/219 |
| 2014/0245359 A1* | 8/2014 | De Foy et al. | 725/62 |

FOREIGN PATENT DOCUMENTS

| | | |
|---|---|---|
| EP | 0919952 A1 | 6/1999 |
| EP | 1641271 A2 | 3/2006 |
| EP | 1670256 A2 | 6/2006 |
| EP | 1777969 A1 | 4/2007 |
| WO | 0067469 | 11/2000 |

OTHER PUBLICATIONS

On2 Technologies, Inc. "TrueMotion VP7 Video Codec", White Paper, Document Version 1.0, Jan. 10, 2005, (13 pages).

Intelligent Streaming, Bill Birney, May 2003, pp. 6 total.

Albanese, Andres, et al. "Priority Encoding Transmission", TR-94-039, Aug. 1994, 36 pages, International Computer Science Institute, Berkeley, California.

Puri, Rohit, et al. "Multiple Description Source Coding Using Forward Error Correction Codes", Oct. 1999, 5 pages, Department of Electrical Engineering and Computer Science, University of California, Berkeley, California.

Pathan, Al-Mukaddim, et al., "A Taxonomy and Survey of Content Delivery Networks", Australia, Feb. 2007. Available at http://www.gridbus.org/reports/CDN-Taxonomy.pdf.

http://tools.ietf.org/html/draft-pantos-http-live-streaming, Oct. 15, 2012.

Non-Final Office Action mailed Jun. 24, 2015 for U.S. Appl. No. 14/052,578.

* cited by examiner

| Media Manifest File | | | | |
|---|---|---|---|---|
| Slice A | Source A | Cost A | Quality A | URL A |
| Slice B | Source B | Cost B | Quality B | URL B |
| Slice B | Source C | Cost C | Quality C | URL C |
| Slice D | Source D | Cost D | Quality D | URL D |
| Slice E | | Cost E | Quality E | URL E |
| Slice F | | Cost F | Quality F | URL F |
| ⋮ | | | | |
| Slice N | Source N | Cost N | Quality N | URL N |

MEDIA MANIFEST FILE GENERATION FOR ADAPTIVE STREAMING COST MANAGEMENT

RELATED APPLICATIONS

This application claims the benefit of U.S. Provisional Application No. 61/712,657, filed Oct. 11, 2012, the entire contents of which are incorporated herein by reference. This application is related to co-pending U.S. application Ser. No. 14/052,578, filed concurrently with the present application. The entire contents of which are incorporated by reference.

TECHNICAL FIELD

The present disclosure relates to media streaming, and more particularly, to cost management for adaptive streaming.

BACKGROUND

The Internet is becoming a primary method for distributing media content (e.g., video and audio or just audio or just video) and other information to end users. It is currently possible to download music, video, games and other media information to computers, cell phones, and virtually any network capable device. The percentage of people accessing the Internet for media content is growing rapidly. The quality of the viewer experience is a key barrier to the growth of video viewing on-line. Consumer expectations for online video are set by their television and movie viewing experiences.

Audience numbers for streaming video on the web are rapidly growing, and there are a growing interest and demand for viewing video on the Internet. Streaming of data files or "streaming media" refers to technology that delivers sequential media content at a rate sufficient to present the media to a user at the originally anticipated playback speed without significant interruption. Unlike downloaded data of a media file, streamed data may be stored in memory until the data is played back and then subsequently deleted after a specified amount of time has passed.

The process for preparing media content for adaptive streaming typically involves taking a source file, such as a movie, or a source feed, such as a broadcast signal, and splitting it into temporal slices (also referred to herein as chunks) or slices of media (e.g., video and audio), and encoding each slice of the media at different quality levels. Typically, the different quality levels are achieved by encoding the media content at different bit rates according to encoding profiles. During playback, and as network conditions fluctuate, a consuming application selects a slice at one of the different quality levels that is best suited for the present network throughput, and the consuming applications adjusts the quality up or down as available bandwidth increases or decreases by selecting subsequent slices at the appropriate quality levels.

Streaming media content over the Internet has some challenges, as compared to regular broadcasts over the air, satellite or cable. Although the adaptive streaming approach provides many advantages, one major disadvantage is that each temporal slice must be encoded multiple times, often a dozen or more, depending on the desired number of quality levels and playback devices or platforms. This requires some time and upfront resource costs. In particular, the computational resources required to encode into the multiple formats is often quite large, as is the necessary bandwidth required to move the encoded slices to their location on a web server from which they are served during playback. This encoding process also takes some time. Also, there may be storage costs associated with storing multiple encodings of the media content. For example, a content provider may have a very large library of media. When encoding the media for adaptive streaming, the content provider has to encode the media into the different quality levels and store the multiple copies of the media at the different quality levels for subsequent adaptive streaming to clients. The encoding and storage costs may be justified when the media is popular and is streamed to various clients. However, if the media is not popular, the encoding and storage of multiple copies of that media may not justify the associated cost. These costs for less popular media and even user-created content or user-uploaded content, may prevent content providers and some users from storing this media content online in a format for adaptive streaming.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Methods and systems for adaptive streaming cost management are described. In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Adaptive video streaming divides a video stream into temporal slices and then encodes the slices at different quality levels, and there is a general correlation between audio/video quality and file size: the larger the size of the slice file, the higher the audio/video quality in the playback. During playback, if network conditions are good enough, higher quality media slices can be delivered and played. If the network is slower or deteriorates, lower quality media slices can be used in exchange for lower playback quality.

Internet bandwidth providers such as Content Delivery Networks (CDNs) like Akamai® or Level3® typically charge based on the amount of data transferred, such that higher quality media slices in adaptive streaming cost more than lower quality media slices since the higher quality slices are correspondingly larger files. Further, bandwidth pricing can vary significantly throughout the world—some of the lowest rates are often found in well-connected, established markets in Europe and the United States, while bandwidth in more isolated or underdeveloped areas such as South America are often substantially higher. Thus, higher quality streaming's intrinsically higher cost due to file size is magnified if delivery of the video is to a relatively expensive region.

When transferring data between two computers, the distance between them affects the time it takes to transfer the data due to messaging latency from the number of "hops" or intermediate network connections the data passes through, the amount of competing network traffic that can cause congestion, and the physical limits of transferring data electronically. During streaming playback, the client side attempts to download media slices quickly enough to sustain playback so that playback is not interrupted, so it is often advantageous to deliver media from a server that is geographically (and network topologically) close to the user. For streaming playback, however, this tends to correspond to the costliest solution if the user is in a high-priced bandwidth region. For example, a company in the United States delivering media to a user in Chile is faced with the decision between delivering the media from a server in the United States (where the cost will be the lowest but may impact performance due the latency) or delivering the media from a server in or near Chile (giving the best performance but at the highest cost).

The sliced-media nature of adaptive streaming presents an opportunity to find a middle ground that balances speed/performance and cost. During playback, each media slice's various quality level is available for retrieval, and normally network conditions are the primary factor in deciding which quality level to use. The decision making process can be augmented to also take into account cost considerations, especially in scenarios when it is more likely that a higher quality slice would be used.

On a high-speed internet connection, it is common for adaptive streaming players to not only be able to download successive media slices quickly enough, but to also be able to download additional, future slices ahead of when they are needed, creating a buffer. Normally this buffer helps protect against variability in network conditions so that playback does not jump between quality levels too often, creating an uneven user experience. For example, if media slices are 8 seconds long and a client has 3 extra slices buffered already, in theory the client could take up to 24 seconds (3 slice*8 seconds) to download the next slice without shifting to a lower quality with smaller slice files. If transmission costs are taken into account, that buffer could also be used as a chance to retrieve a slice from a slower but cheaper storage location. Continuing the previous example, a playback client in Chile with a playback buffer of 24 seconds could begin to transfer media slices from servers in the United States. Although the slices would transfer more slowly, the slower transfer would be covered by the buffer time while the slices are obtained at a lower rate or cost.

Delivery costs may be incurred a user, such as by way of a subscription. In implementations, the delivery costs can be charged against a user subscription. For example, a user can have a subscription that provides a time-based (e.g., monthly) quota of data. When the user streams content, the data can be charged against the user's quota. User's can also be charged on a per-use basis. Other mechanisms for charging users for delivery costs are myriad. Delivery costs can also be incurred to a content provider, the service provider, media publisher, etc.

Even in the event of little or no buffer, the cost consideration could still be used if the network connection is fast enough. For example, if the media slices are 8 seconds long and they can be transferred in 2 seconds from a server in Argentina to the user in Chile at a higher delivery cost, but transferring them from a server in the United States at a lower delivery cost takes 6 seconds per slice, transferring them from the United States is still feasible because the time to transfer the slice is less than the playback time of the slice. From the user's perspective they achieve the same playback quality, but the cost of delivery is significantly lower. Each delivery cost can be charged at a different rate. For example, a first delivery cost can be charged at a first rate and a second delivery cost can be charged at a second rate. Alternatively, the delivery cost can be identified and measured in terms of other metrics.

Regional pricing differences are not the only scenario in which cost considerations can be useful. Another scenario would be the decision to transfer directly from a pool of origin storage servers directly or via a CDN. A CDN can be very helpful in distribution scalability because data is transferred from origin storage servers into the CDN, and then fanned out through a server hierarchy to many edge server locations throughout the world. For popular video content, for example, this allows the transfer of the media to hundreds of thousands or even millions of users. In terms of costs, the content owner is typically billed for the transfer of data from the origin storage servers to the CDN, and then from the CDN edge locations to the users. If the files are accessed frequently (such as in popular video content), they will be transferred from the origin storage servers only a few times and remained cached in CDN servers and delivered to users many times. For less popular content, however, the files may expire from the CDN caches frequently, such that the files have to be re-retrieved from the origin storage servers many times. In this scenario, the cost of delivery could become prohibitive. As before, however, cost could be taken into consideration when deciding the source location for transferring the files to users—if the content is not very popular, many of the media slices—especially the large, high quality media slices—could be delivered directly from a small pool of origin storage servers, skipping the delivery cost through the CDN. If the content rises in popularity, such that the media slices have a good probability of being cached in CDN servers, the delivery path could be shifted so that the slices are delivered from the origin storage servers to the CDN and then to the users.

In some implementations, cost can be related to whether the client is subscribed to a particular service that has its own CDN. For example, a mobile phone client can have access to a CDN of a mobile carrier at a reduced rate since the mobile phone client is subscribed to the mobile carrier. When a client is using the CDN infrastructure of the mobile carrier, the client can use the CDN of the mobile carrier to obtain media slices. In other implementations, a service provider (e.g., a mobile carrier) offers a split data plan that distinguishes between different types of data when determining allowable consumption. For example, the split data plan can include an amount of data that is a separate amount than media streaming. When a client operates in this type of data plan, it can determine whether it would be beneficial to download a set of media slice from a particular server such that it affects data or media usage under the plan in a different way. For example, a client can request media slices from a particular server that does not count against a media streaming maximum (e.g., a monthly quota).

Figure 1:
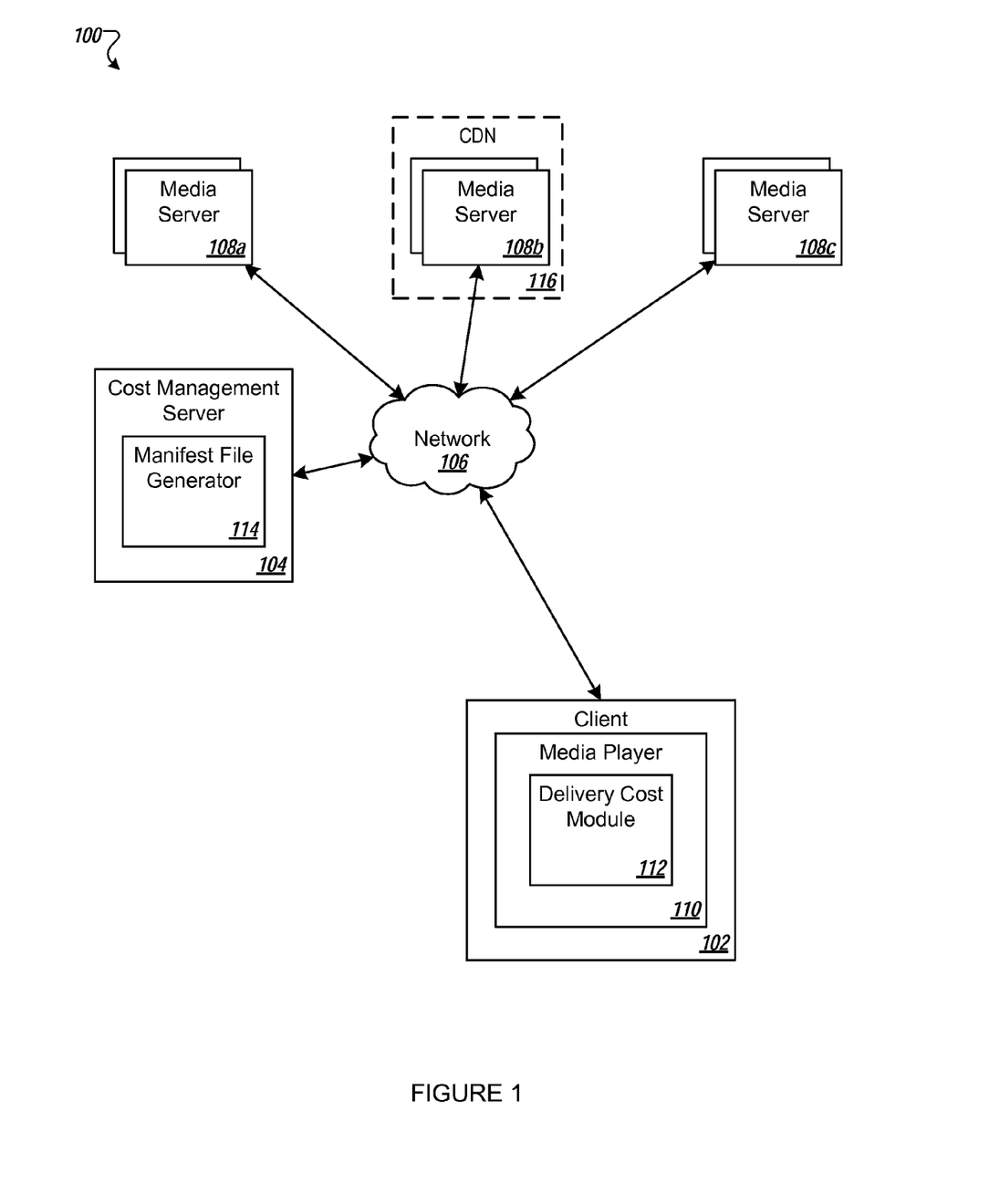
FIG. 1 is a block diagram of a network architecture in which embodiments of an adaptive streaming cost management system may operate.
Figure 2:
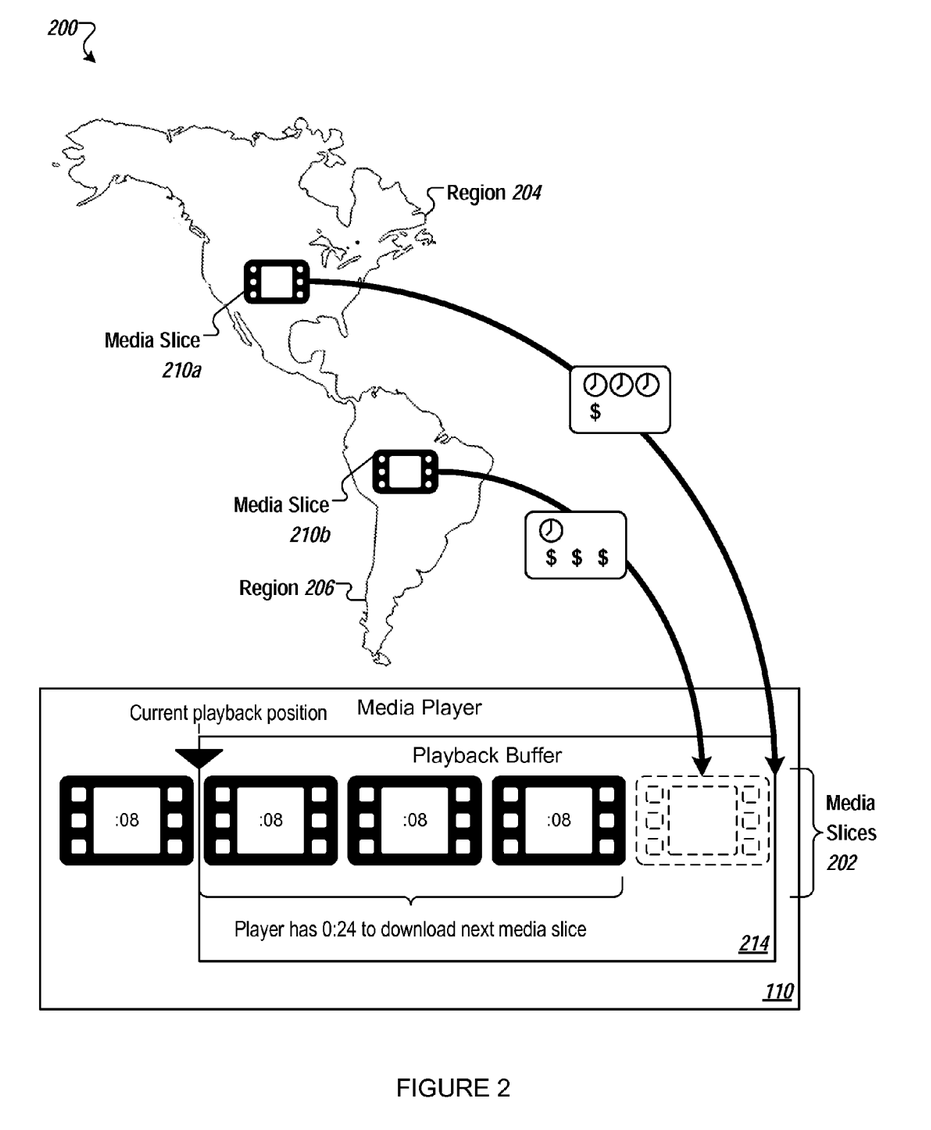
FIG. 2 illustrates client-based logic of an adaptive streaming cost management system according to embodiments.
Figure 3:
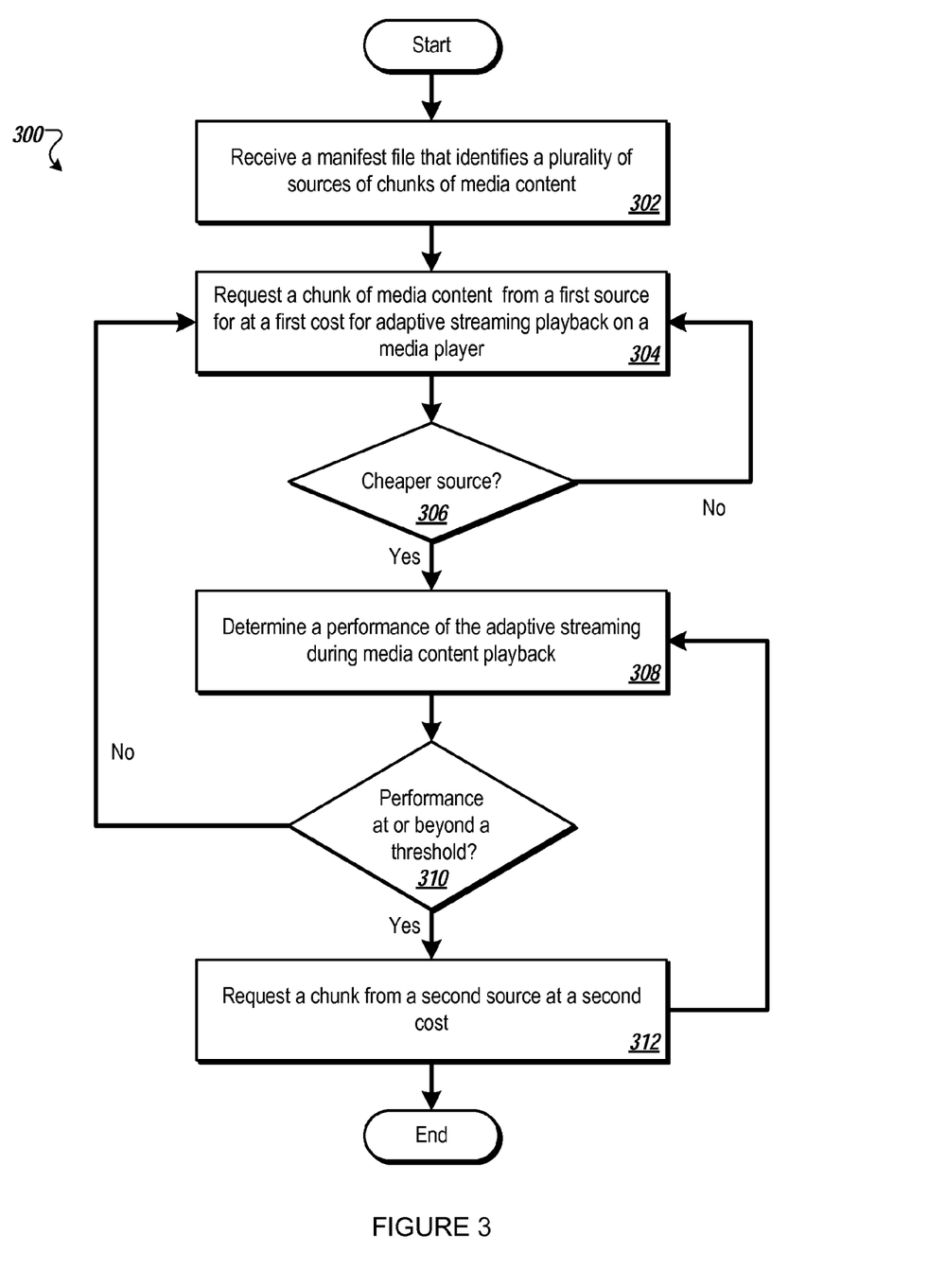
FIG. 3 is a flow diagram of a method of adaptive streaming cost management according to one embodiment.

A number of different methods exist for taking cost into consideration in adaptive streaming. Some example approaches may include active client-side intelligence, as illustrated in FIGS. 1-3. Other example approaches may include server-side intelligence that generates a media manifest file, as illustrated in FIGS. 4-7

FIG. 1 is a block diagram of a network architecture 100 in which embodiments of an adaptive streaming cost management system may operate. Example architectures may include one or more client computing systems 102 and one or more cost management server computing systems 104 coupled via a data communications network 106 (e.g., public network such as the Internet or private network such as a local area network (LAN)). In embodiments, architecture 100 includes one or more media servers 108a-c in different geographical locations that that can receive requests for media over the network 106 from a media player 110 executing on the client computing systems 102. The network 106 may include the Internet and network connections to the Internet. Alternatively, cost management server 104, the media server 108 and the client 102 may be located on a common Local Area Network (LAN), Personal area network (PAN), Campus Area Network (CAN), Metropolitan area network (MAN), Wide area network (WAN), wireless local area network, cellular network, virtual local area network, or the like. The client 102 may be a client workstation, a server, a computer, a portable electronic device, an entertainment system configured to communicate over a network, such as a set-top box, a digital receiver, a digital television, a mobile phone, a smart phone, a tablet, or other electronic devices. For example, portable electronic devices may include, but are not limited to, cellular phones, portable gaming systems, portable computing devices or the like. The client 102 may have access to the Internet via a firewall, a router or other packet switching devices. The cost management server computing system 104 and the media server 108 may be a network appliance, a gateway, a personal computer, a desktop computer, a workstation, etc.

Figure 4:
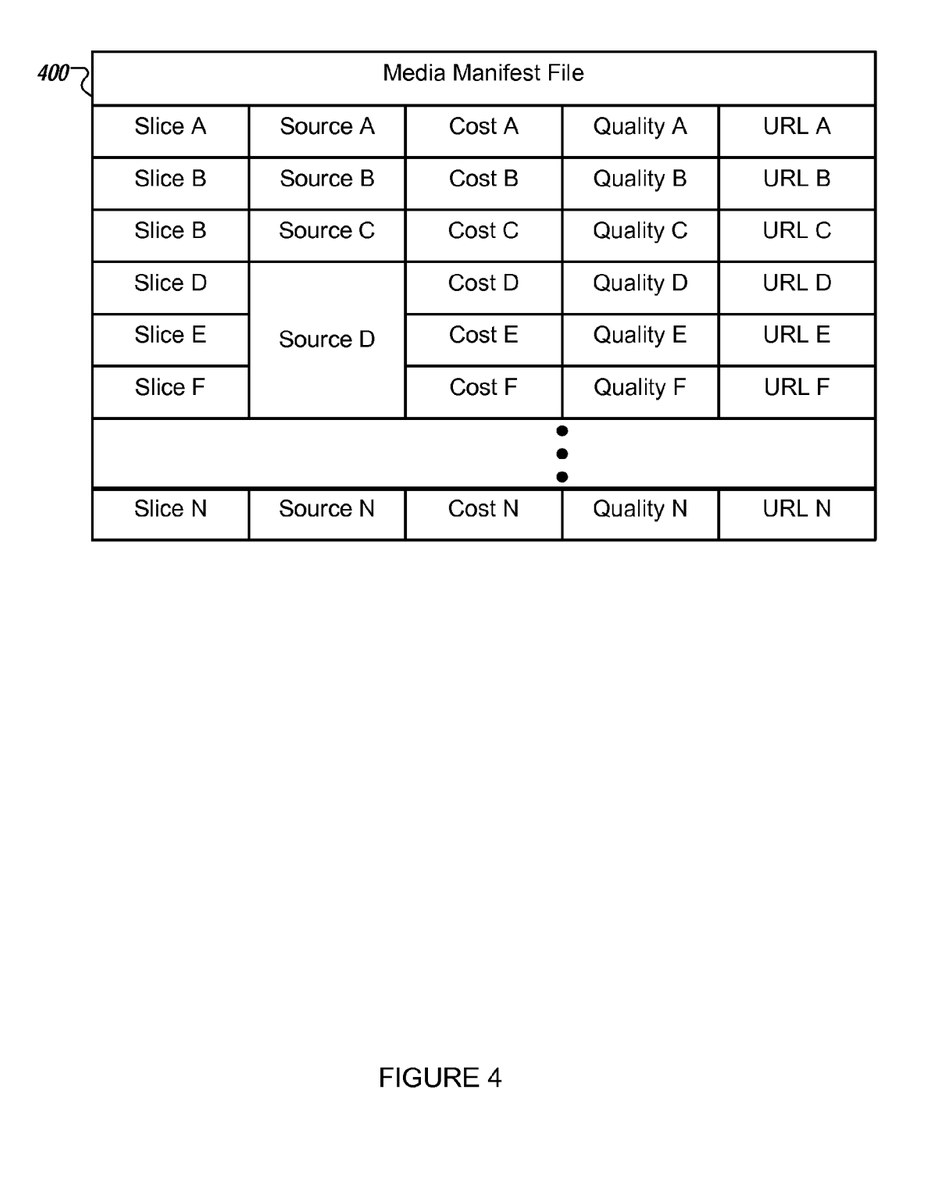
FIG. 4 illustrates a media manifest file of an adaptive streaming cost management system according to one embodiment.
Figure 5:
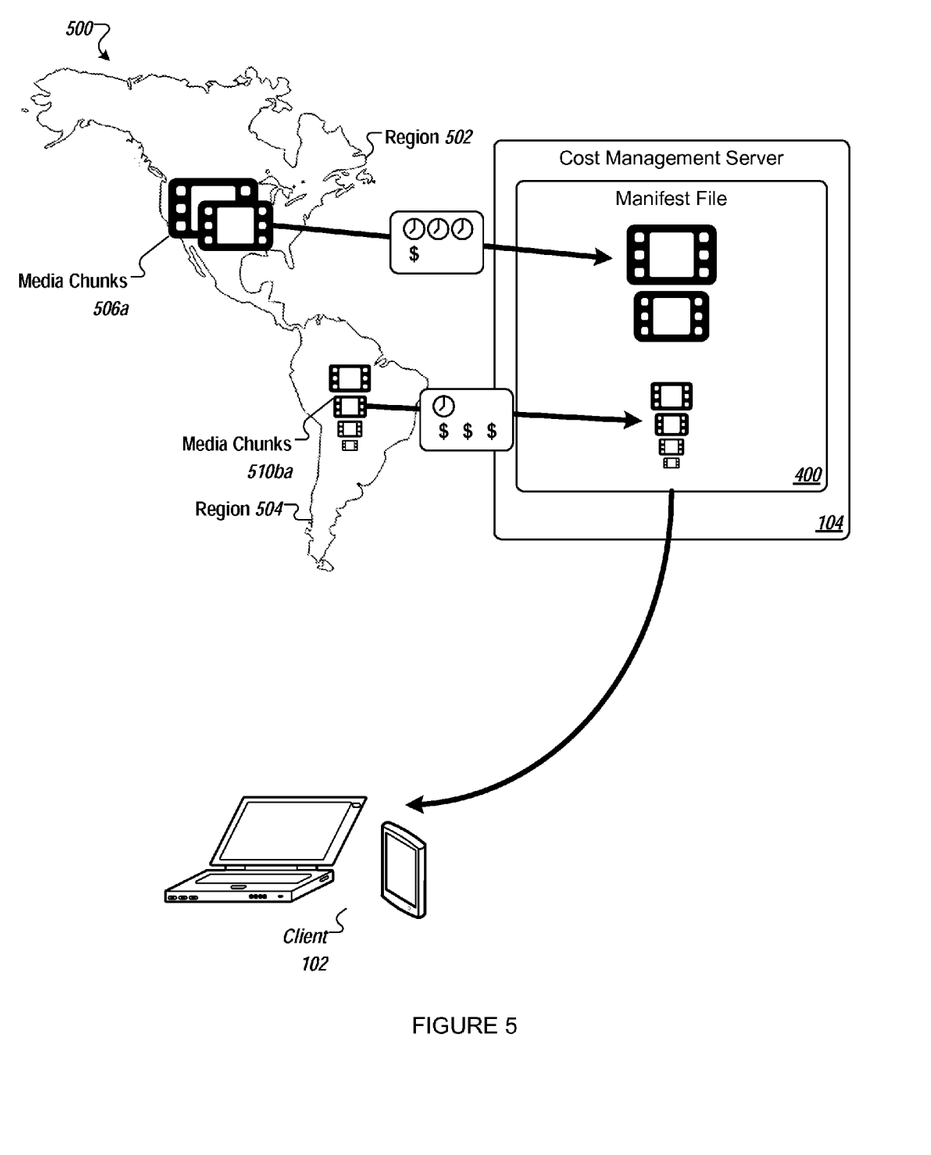
FIG. 5 illustrates server-based logic for generating a media manifest file of an adaptive streaming cost management system according to one embodiment.

In the depicted embodiment, the cost management server computing system 104 may execute a manifest file generator 114, which is configured to orchestrate a manifest file for adaptive streaming cost management, as described in further detail in conjunction with FIGS. 4-5. The cost management server 104 can include web server functionality that receives requests for encoded media content over the network 106 from media players 110 executing on the client computing systems 102. Alternatively, the functionality of the adaptive streaming cost management and the web server can be distributed over two or more cost management machines 104 (not shown). For example, in one embodiment, one cost management server computing system may host the manifest file generator and not a web server, and another cost management server computing system (not illustrated) can host a web server to handle requests for the media content. Alternatively, other configurations are possible as would be appreciated by one of ordinary skill in the art having the benefit of this disclosure.

In one embodiment, the architecture 100 also includes one or more content repositories, such as data storage devices, that are configured to communicate with one or more media servers 108. The data storage devices may be content repositories in which encoded media content may be stored. A publisher or a distributor of media content may store the encoded media content in the data storage. Media content from the publisher may be transferred over the network to the media server 108, which may be configured to receive, process, and store media content. In one embodiment, the media server 108 delivers the media content to the client 102, which is configured to play the content on a media player 110 that is operating on the client 102. The media server 108 delivers the media content by streaming (e.g., adaptively streaming) the media content to the client 102. In a further embodiment, the client 102 is configured to receive different portions or slices of the media content from multiple locations.

In other embodiments, media content from the media server 108 may be replicated to other locations and served to the clients 102, such as by using web servers located on the network. Alternatively, proxy cache servers or edge servers can be used. In a further embodiment, the media content may be forwarded directly to the other web servers or proxy cache servers through direct communication channels without the need to traverse the Internet. In another embodiment, the web servers, proxy cache servers, and media server 108 may be organized in a hierarchy of a CDN 116 to deliver the media content to the client 102. As described above, a CDN 116 is a system of computers networked together across the Internet that cooperates transparently to deliver content. In this embodiment, one media server 108 can be an origin content server. The CDN 116 may also include interconnected computer networks or nodes to deliver the media content.

In one embodiment, a publisher stores encoded media content in an original content file in the data storage to be distributed to one or more clients 102. The content file may include data corresponding to video and/or audio corresponding to a television broadcast, sporting event, movie, music, concert or the like. The original content file may include uncompressed video and audio, or alternatively, uncompressed video or audio. Alternatively, the content file may include compressed content (e.g., video and/or audio) using standard or proprietary encoding schemes. The original content file from the publisher may be digital in form and may include media content having a high bit rate, such as, for example, 2 Mbps or greater.

The media server 108 may receive the content file from the publisher. The media server 108 can decompress the content file (if encoded) into raw audio and/or video, segmenting the raw audio and/or video of the content file into multiple portions of the content (e.g., slices), and storing multiple copies of the content file in the data storage and among a plurality of servers 108. The portions may have an equal duration, or alternatively, the portions may have equal file sizes, or vary one to another according to other requirements. During operation, as describe in more detail below, each portion of the encoded media content may be retrieved, decoded and re-encoded into an encoded representation of that portion of the media content at the specified quality level. Typically, in adaptive streaming, a media content file can be encoded into multiple encoded representations according to different quality profiles and stored as separate files that are independently requestable from the data storage via the cost management server 104.

The media player 110 on the client 102 can include a delivery cost module 112 to perform adaptive streaming cost management. The media player 110 can request media content from one or more cost management server 104 and can also request a media manifest file. The cost management server 104 in turn can transmit the media manifest file to the client 102. For example, the media manifest file can describe metadata for a video and could include information about different storage locations along with information about their relative costs, quality, priority, etc. The delivery cost module 112 then can use the data included in the media manifest file factors (e.g., geographical location, cost, quality, priority, etc.) when deciding to shift to a higher or lower bit rate, but it could also decide from which media server 108 to request media content or media slices from based on cost. If the delivery cost module 112 determined that it had a sufficiently large amount of data in a playback buffer or that it could risk a possibly slower slice file transfer, it could opt to request a subsequent media slice of the same quality from a slower and cheaper media server 108. For example, the delivery cost module 112 can use the manifest file to determine a media server 108*a* to which the media player 110 can send a request for slices of media content for adaptive streaming. The delivery cost module 112 can determine a performance of the adaptive streaming of the media content from the media server 108*a*. When the adaptive delivery cost module 112 determines that the performance of the adaptive streaming is at or beyond a performance threshold, the media player 110 can request one or more subsequent slices from a second media server 108*b*. When the delivery cost module 112 determines that the performance of the adaptive streaming is below a performance threshold, the media player 110 can request one or more subsequent slices from the media server 108*a*. The performance threshold can include a predetermined amount of slices of media in a playback buffer. The performance threshold can also include a minimum bit rate. Alternatively, the performance threshold can be defined based on various metrics used to measure performance of adaptive streaming.

Some adaptive streaming implementations cannot be modified easily. For example, in the Apple® iOS™ platform and the Android™ platform by Google®, an adaptive streaming implementation exists as part of the operating system and may be modified by third party applications. In these scenarios, cost can still be taken into consideration with some assistance by the server as described in conjunction with FIGS. 4-7.

In implementations, the delivery cost module 112 can identify characteristics of the media servers 108 that it can use to determine where to request media slices. The delivery cost module 112 can submit requests to multiple media servers 108 and measure the response time for each server. If one media server 108 takes 200 ms to respond while another takes 50 ms, for example, the delivery cost module 112 can select to server with the shortest response time. The delivery cost module 112 can also determine other characteristics about the servers, such as average response rate, average bandwidth, average transfer time, average speed, server processor commitment, memory usage, number of requests a server handles per a unit of time (e.g., seconds) and a rolling average of any of the characteristics. The delivery cost module 112 can monitor server characteristics over time and build a server profile that the delivery cost module 112 can use when determining where to request media slices or files. In some implementations, the server can expose an Application Programming Interface (API) that the client can use to obtain server characteristics. In implementations, a server can permit a client to query a server for its server characteristics. In implementation, actual server characteristics can be compared to threshold or expected server characteristics. For example, a number of requests a server handles per second can be compared against an expected capacity. The delivery cost module 112 can use this comparison when determining where to request media slices or files. For example, if a particular server is running at 90% load of a maximum threshold capacity, the delivery cost module 112 can factor this into decisions of where to request media slices or files.

In some implementations, the delivery cost module 112 can also determine a cost associated with each server. The delivery cost module 112 can select the server with the lowest cost that can also provide a media slice or file within an acceptable response time. For example, if multiple servers can provide or stream a media slice or file faster than the client needs, the delivery cost module 112 can select the cheapest server from among those multiple servers.

In some embodiments, the cost management server 104 includes a content management system (CMS) that manages the encoded media content, for example, using a database stored in data storage. In one embodiment, the CMS is a computing system including a memory and a processing device coupled to the memory, the processing device to execute the manifest file generator 114. The CMS may also manage the available encoded media content using one or more media manifest files. In an embodiment, a publisher (or server administrator) can create media manifest files using the CMS. The media manifest files can be fetched by or pushed to the media player(s) 110.

The cost of network bandwidth can vary significantly in different parts of the world. Traditionally the cost differences have been very challenging to content owners, forcing content owners to risk high costs or to artificially limit the quality of media streamed to developing markets or remote locations. Adaptive streaming solutions that divide the media into slices, however, give content providers the opportunity to provide high quality experiences for consumers of media while still having some control over their costs.

In the depicted embodiment, a manifest file generator 114 (or server administrator) can create a media manifest file. The media manifest file can be fetched or pushed to the media player 110.

In other embodiments, the computing architecture 100 may include other devices, such as directory servers, Digital Rights Management (DRM) servers, statistic servers, devices of a network infrastructure operator (e.g., an ISP), or the like.

The adaptive streaming cost management system 100 can include the cost management server 104, delivery cost module 112, manifest file generator 114, or may include more or less components.

FIG. 2 illustrates client-based logic of an adaptive streaming cost management system 200 according to embodiments. System 200 can include the media player 110 of FIG. 1. As illustrated, the media player 110 has received four media slices 202 from region 204, one of which has been played back, as indicated by the current playback position. Three media slices 202 remain in a playback buffer 214. The media player 110 (e.g., delivery cost module 112) can request subsequent media slices that it may download while not affecting overall media playback. The media player 110 can determine whether to request media slice 210*a* from region 204 or media slice 210*b* from region 206. The media player 110 can use the manifest file, as described herein, during this determination. For example, queued media slices 202 to the right of the current playback position are 8 seconds each, which means that the media player has 24 seconds in which to request and obtain the next media slice 202. Using the manifest file, the media player 110 can ascertain if a copy of the next media slice 202 can be obtained from a cheaper source, such as from region 206. In the example, if media slice 210*a* could be obtained within 3 seconds from region 204 and media slice 210*b* could be obtained within 6 seconds from region 206 at a lesser cost, the media player 110 can request the media slice 210*b* from region 206 to reduce overall costs of adaptive streaming.

FIG. 3 is a flow diagram 300 of a method of adaptive streaming cost management according to one embodiment. The method 300 is performed by processing logic that may comprise hardware (circuitry, dedicated logic, etc.), software (such as is run on a general purpose computing system or a dedicated machine), firmware (embedded software), or any combination thereof. In one embodiment, the delivery cost module 112 of FIG. 1 performs the method 300. Alternatively, other components of the client computing system can perform some or all of the operations of method 300.

Referring to FIG. 3, processing logic begins at block 302 by receiving a manifest file that identifies sources of slices of media content. A first media source can be located in a first geographical region and the second media source can be located in a second geographical region, as illustrated in the system 200 of FIG. 2. Delivery of the slices of media content to the media player can incur a first delivery cost.

At block 304, processing logic requests slices of media content for playback on the media player from the first media source over a network using adaptive streaming.

At block 306, processing logic can determine, such as by using the manifest file, whether other sources of media content can deliver the same media slice at a lower cost. If no, then processing logic continues, at block 304, to request subsequent slices of media from the first source. If yes, then processing logic can, at block 308, determine a performance of the adaptive streaming during media content playback. If the performance is at or beyond a performance threshold at block 310, then the processing logic can, at block 312, request a subsequent slice (or chunk) of media from the second source at a second cost. Delivery of the one or more subsequent slices to the media player from the second media source can incur a second delivery cost that is less than the first delivery cost. The method 300 can continue until the processing logic is no longer needs to request slices of the media.

Of course, method 300 is one of many ways of using the determination of cheaper costs using the costs factors of the manifest file at the client device. In other embodiments, the client can determine which quality of file to request for the slice and where to request the file using various factors as described herein. Similarly, when implemented on the server, the method 300 may use the cost determination to create or modify an existing manifest to control where the files are requested based on cost as described herein.

In some implementations, before block 302, processing logic can send a playback request of the media content to a server device over the network. In some implementations, processing logic can receive a media manifest file from the server device over the network in response to the sending the playback request. In other implementations where the media manifest file identifies the performance threshold, processing logic can compare the performance against the performance threshold and select the second media source based on the comparison.

FIG. 4 illustrates a media manifest file 400 of an adaptive streaming cost management system according to one embodiment. The media manifest file 400 can be a list or a table that includes information relating to one or more media slices. As illustrated, the media manifest file 400 includes media slices A-N, media sources A-N, costs A-N, quality A-N and URL A-N. Each of the sources, costs, qualities and URLs can be different. In implementations, some of these data are the same. For example, source B and source C can have the same slice B, but at a different cost, quality and URL. In another example, a source (e.g., source D) includes multiple slices (e.g., slices D-F). Any number of slices and corresponding data can be included in the media manifest file 400. The media manifest file can include any data relating to adaptive streaming media slices, such as a geographical location, a delivery cost, a quality, a size, etc. The media manifest file can be used as a separate file than a metadata descriptor file that is used for adaptive streaming or can be integrated into the same file (i.e., the cost factors can be built into the existing data in the descriptor files).

In one embodiment, the media manifest file 400 is M3U file. A M3U file is a computer file format that stores multimedia playlists. Typically, a M3U file is a plain text file that specifies the locations one or more media files. Each line carriers on specification, which can be an absolute local pathname, a local pathname relative to the M3U file location, or a URL (both absolute and relative URLs). The M3U file can also include comments, which are prefaced by the '#' character. In extended M3U, the '#' character may also introduce extended directives. The Unicode version of M3U is M3U8, which uses UTF-8 Unicode characters. The media manifest file 400 can also specify multiple location choices, as well as the associated costs. The media manifest file 400 gives an overview of the content and is initially requested by a media player in order to know how to request specific files or data ranges within a file. A web server or media server can send transport stream files in response to the requests, however, the media content may be stored in one or multiple files. Regardless of how the media content is stored, the web server or media server can send the transport stream files with the corresponding slice of media content requested. When the media content is stored as discrete files, the cost management server 104 or media server 108 may send the discrete file (encoded according to the appropriate quality profile) as the transport stream file in response to the request. However, when the media content is stored a single file, an identifier and an offset may be used to retrieve the appropriate slice of the file (encoded according to the appropriate quality profile), and the cost management server 104 or media server 108 can send this slice as a transport stream file in response to the request.

In one embodiment, a M3U8 file 400 is created with the available quality profiles and where the media content at those profiles are located even though the media content at those different profiles do not exist at those locations. A media player, such as media player 110 of FIG. 1, reads the media manifest file for the media content that is being requested. The media manifest file 400 may also include a unique content identifier (UCID), duration of the media content, available quality profiles and locations of where the media content can be retrieved. The quality profiles may specify parameters, such as width and height of the image (i.e., image size), video bit rate (i.e., rate at which the video is encoded), audio bit rate, audio sample rate (i.e., rate at which the audio is sampled when captured), number of audio tracks (e.g., mono, stereo, or the like), frame rate (e.g., frame per second), staging size, or the like. For example, the media players may individually request different quality levels of the same media content. Each media player may request the same portion (e.g., same time index) of the media content but at different quality levels. For example, one media player may request a slice having HD quality video, since the computing device of the requesting media player has sufficient computational power and sufficient network bandwidth, while another media player may request a slice having a lower quality, since its computing device may not have sufficient network bandwidth, for example. In one embodiment, the media player shifts between quality levels at the slice boundaries by requesting slices from different copies (e.g., different quality streams) of the media content. Alternatively, the media player can request the slices using other techniques that would be appreciated by those of ordinary skill in the art having the benefit of this disclosure. The media manifest file may also include other metadata, including, for example, air date of the content, title, actresses, actors, a start index, an end index, proprietary publisher data, encryption level, content duration, episode or program name, publisher; available tools for the end-user navigational environment, such as available menus, thumbnails, sidebars, advertising, fast-forward, rewind, pause, and play, or the like; or bit-rate values, including frame size, audio channel information, codecs, sample rate, and frame parser information.

In implementations, the media manifest file 400 identifies a first web address (e.g., URL) where the media content is located at the first media source and a second web address where the media content is located at the second media source. The media manifest file 400 also can identify a rule that a media player is to request the one or more subsequent slices from a second media server when the performance of the adaptive streaming is at or beyond the performance threshold. The media manifest can also include a rule to instruct a media player to request one or more media slices from a first media server when a performance of the adaptive streaming is above a performance threshold. The media manifest file can further identify a second web address where a copy of the plurality of media slices is geographically located at a second media server.

The media manifest file can also identify a third web address where the media content is located at a third media source. The media manifest file can identify yet another rule that a media player is to request the one or more subsequent slices of media from the third media source when the performance is at or beyond a second performance threshold. For example, the first performance threshold can be a first amount of time that a media player has been playing at a given bit rate. A media player can request and playback media slices from a first media server. The second performance threshold can be a second amount of time that a media player has been playing at the given bit rate. When the first performance threshold is met, then the media player can request media slices from a second media server at the same bit rate but with a lesser delivery cost. When the second performance threshold is met, then the media player can request media slices from a third source at the same bit rate but with a lesser delivery cost that the first and second media servers.

When media slices geographically located at one or more media servers are encoded at different quality levels, the media manifest file can further identify another rule that instructs the media player to request the plurality of media slices from a second media server at a first quality level when the performance is at or beyond a second performance threshold, and from the second media server at a second quality level when the performance is below the second performance threshold.

FIG. 5 illustrates server-based logic 500 for generating a media manifest file of an adaptive streaming cost management system according to one embodiment. In implementations, when the cost management server 104 receives a request for media content from a client 102, the cost management server 104 obtains data from each media server (not shown) and uses the data from each media server to generate a media manifest file that is specific to the client 102 and to the requested media. In one implementation, when the cost management server 104 receives a request for a media metadata or media manifest file 400 from a client 102, the cost management server 104 can use standard geo-location libraries or services to determine the geographical location (e.g., country of origin) of the requesting client 102. The cost management server 104 can then generate a media manifest file 400 by taking into account the relative distance (in terms of geography or network topology). For example, a server 502 in the United States, upon determining that the client 102 is in Chile, can send back a media manifest file 400 that lists one or more Chilean servers 504 with lower quality levels with the smaller files (including media chunks 510ba) and lists United States servers 502 for higher quality levels with larger files (including media chunks 506a). Because the higher quality slices can take longer to transfer (due to their larger file size) but also due to the higher latency, the cost management server 104 can optimize the user experience for the given network conditions, but can also manage costs for the content owner or publisher. In one embodiment, adaptive streaming cost management in the server 104 is implemented in a cost management system (CMS). Alternatively, the adaptive streaming cost management can be implemented in other severs in the network. It should be noted that the media manifest file 400 could also be a static manifest file that sets the conditions based on parameters set by the designer. Alternatively, as described above, the server that manages media manifest file 400 can make these decisions at run time while receiving client requests for content. Further, the cost management server 104 that generates and manages the media manifest file can use feedback, such as log files, server stats, quality of service (QoS) data, for determining the parameters of the media manifest file to strike a balance between the cost of adaptive streaming and the user's experience.

In one embodiment, the adaptive streaming cost management, whether on the client 102 or cost management server 104, can use various inputs to decide where to request the data. These various inputs can include the location of the client 102, the latency in requests to the different locations (e.g., latency for requests for the file at that quality level from US based media servers and the latency for the file at the same or different quality level from the Chilean based media servers), amount of data in buffer 214, current quality levels requested, previous historical data regarding the client's streaming performance, or the like. These inputs can be measured by the client 102 or the server 104 or can be provided by other systems. In an example, the client 102 can submit a request for a media slice or file directly to a media server. The media server can respond, such as with at least a portion of the requested media slice or file. The client 102 can measure the time it takes for the media server to respond and can use the response time to determine whether to request subsequent media slices from that server.

Figure 6:
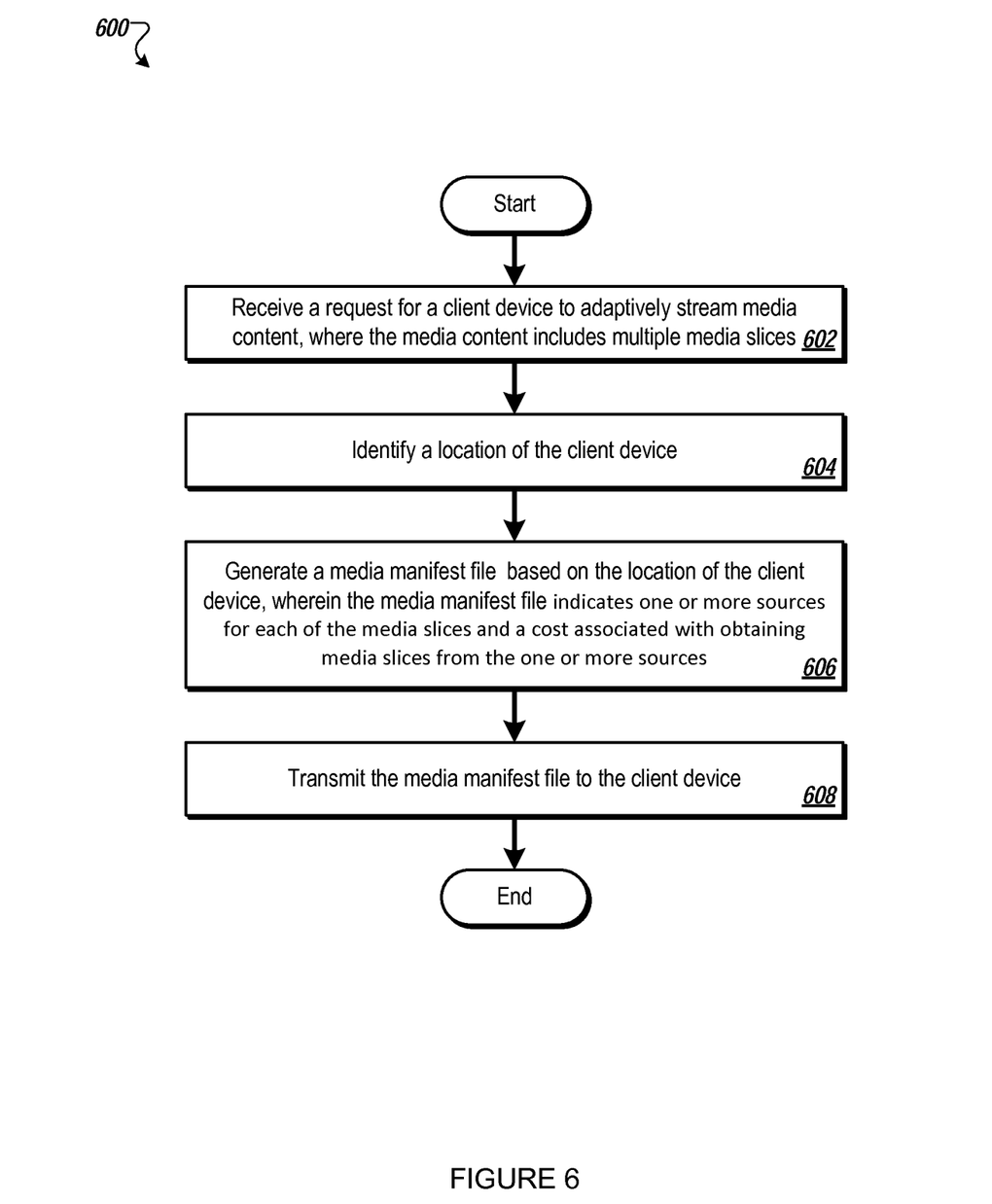
FIG. 6 is a flow diagram of a method of generating a media manifest file of an adaptive streaming cost management system according to one embodiment.

FIG. 6 is a flow diagram of a method 600 of generating a media manifest file of an adaptive streaming cost management system according to one embodiment. The method 600 is performed by processing logic that may comprise hardware (circuitry, dedicated logic, etc.), software (such as is run on a general purpose computing system or a dedicated machine), firmware (embedded software), or any combination thereof. In one embodiment, the server-side logic of FIG. 5 performs the method 600. Alternatively, other components of the client computing system, server computing system or both can perform some or all of the operations of method 600.

Referring to FIG. 6, processing logic begins with receiving a request from a media player executing on a client device to adaptively stream media content at block 602. The media content can include multiple media slices. At block 604, processing logic identifies a geographical location of the client device from the request. Identifying the geographical location of the client device can include extracting data from the request and sending a geographical location request with the extracted data from a location service to determine a geographical region of origin of the client device.

At block 606, processing logic generates a media manifest file based on the geographical location of the client device.

The media manifest file, such as the media manifest file 400 of FIG. 4, can indicate one or more media sources at which a copy of the plurality of media slices is geographically located and a cost associated with delivery of the plurality of media slices from the respective one of the one or more media sources. At block 608, processing logic transmits the media manifest file to the client device over the network.

Figure 7:
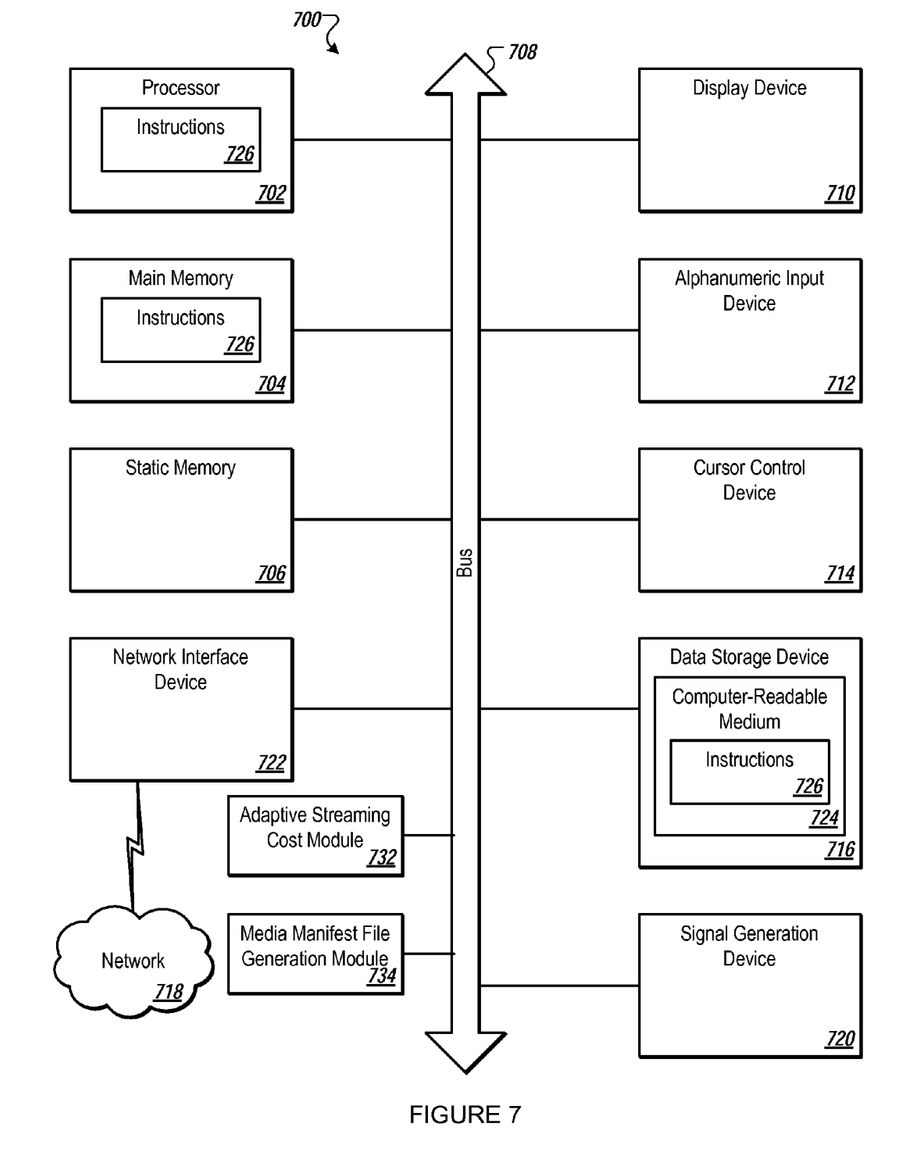
FIG. 7 illustrates a diagrammatic representation of a machine in the example form of a computing system for adaptive streaming cost management.

FIG. 7 illustrates a diagrammatic representation of a machine in the exemplary form of a computing system for adaptive streaming cost management. Within the computing system 700 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for adaptive streaming cost management, such as the method 300 described above. In one embodiment, the computing system 700 represents various components that may be implemented in the server computing system 106 as described above. Alternatively, the server computing system 106 may include more or less components as illustrated in the computing system 700.

The exemplary computing system 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a data storage device 716, each of which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute computer instructions 726 or processing logic (e.g., for performing adaptive streaming cost management or media manifest file generation) and for performing any of the operations and steps discussed herein.

The computing system 700 may further include a network interface device 722. The computing system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 716 may include a computer-readable storage medium 724 on which is stored one or more sets of instructions 726 (e.g., for executing adaptive streaming cost management or media manifest file generation) embodying any one or more of the methodologies or functions described herein. The adaptive streaming cost management and media manifest file generation may also reside, completely or at least partially, within the main memory 704 and/or within the processing device 702 during execution thereof by the computing system 700, the main memory 704 and the processing device 702 also constituting computer-readable storage media. The adaptive streaming cost management may further be transmitted or received over a network via the network interface device 722.

While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media or other types of mediums for storing the instructions. The term "computer-readable transmission medium" shall be taken to include any medium that is capable of transmitting a set of instructions for execution by the machine to cause the machine to perform any one or more of the methodologies of the present embodiments.

An adaptive streaming cost management module 732, otherwise referred to as a delivery cost module, and a media manifest file generation module 734, associated components, and other features described herein can be implemented as discrete hardware components or integrated in the functionality of hardware components such as ASICS, FPGAs, DSPs, or similar devices. The adaptive streaming cost management module 732 may implement operations of adaptive streaming cost management as described herein. The media manifest file generation module 734 may implement operations of media manifest file generation as described herein. In addition, the adaptive streaming cost management module 732 and the media manifest file generation module 734 can be implemented as firmware or functional circuitry within hardware devices. Further, the adaptive streaming cost management module 732 and the media manifest file generation module 734 can be implemented in any combination hardware devices and software components.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "communicating," "capturing," "executing," "defining," "specifying," "creating," "recreating," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
    receiving, by a processing device, a request over a network from a media player executing on a client device to adaptively stream media content, wherein the media content comprises a plurality of media slices;
    identifying, by the processing device, a geographical location of the client device from the request;
    generating, by the processing device, a media manifest file based on the geographical location of the client device, wherein the media manifest file is to indicate one or more media sources at which a copy of the plurality of media slices is geographically located and a charge price associated with delivery of the plurality of media slices from the respective one of the one or more media sources; and
    transmitting, by the processing device, the media manifest file to the client device over the network.

2. The method of claim 1, wherein the media manifest file comprises a rule to instruct the media player to request one or more of the plurality of media slices from a first media source of the one or more media sources when a performance of the adaptive streaming is above a performance threshold, wherein the media manifest file further identifies a first web address where the copy of the plurality of media slices is geographically located at the first media source of the one or more media sources.

3. The method of claim 2, wherein the media manifest file further identifies another rule to instruct the media player to request the one or more of the plurality of media slices from a second media source of the one or more media sources when the performance is at or beyond a second performance threshold, wherein the media manifest file further identifies a second web address where the copy of the plurality of media slices is geographically located at the second media source of the one or more media sources.

4. The method of claim 3, wherein the first web address comprises a first uniform resource locator (URL) that identifies a first location of the first media source and a second URL that identifies a second location of the second media source.

5. The method of claim 4, wherein the copies of the plurality of media slices geographically located at the one or more media sources are encoded at different quality levels.

6. The method of claim 5, wherein the media manifest file further identifies another rule that instructs the media player to request the plurality of media slices from a second media source of the one or more media sources at a first quality level when the performance is at or beyond a second performance threshold, and from the second media source at a second quality level when the performance is below the second performance threshold.

7. The method of claim 1, wherein the identifying a geographical location of the client device comprises:
    extracting data from the request; and
    sending a geographical location request with the extracted data to a location service to determine a geographical region of origin of the client device.

8. A non-transitory computer readable storage medium including instructions that, when executed by a computing system, cause the computing system to perform operations comprising:
    receiving, by a processing device, a request over a network from a media player executing on a client device to adaptively stream media content, wherein the media content comprises a plurality of media slices;
    identifying, by the processing device, a geographical location of the client device from the request;
    generating, by the processing device, a media manifest file based on the geographical location of the client device, wherein the media manifest file is to indicate one or more media sources at which a copy of the plurality of media slices is geographically located and a charge price associated with delivery of the plurality of media slices from the respective one of the one or more media sources; and
    transmitting, by the processing device, the media manifest file to the client device over the network.

9. The non-transitory computer readable storage medium of claim 8, wherein the media manifest file comprises a rule to instruct the media player to request one or more of the plurality of media slices from a first media source of the one or more media sources when a performance of the adaptive streaming is above a performance threshold, wherein the media manifest file further identifies a first web address where the copy of the plurality of media slices is geographically located at the first media source of the one or more media sources.

10. The non-transitory computer readable storage medium of claim 9, wherein the media manifest file further identifies another rule to instruct the media player to request the one or more of the plurality of media slices from a second media source of the one or more media sources when the performance is at or beyond a second performance threshold, wherein the media manifest file further identifies a second web address where the copy of the plurality of media slices is geographically located at the second media source of the one or more media sources.

11. The non-transitory computer readable storage medium of claim 10, wherein the first web address comprises a first uniform resource locator (URL) that identifies a first location of the first media source and a second URL that identifies a second location of the second media source.

12. The non-transitory computer readable storage medium of claim 11, wherein the copies of the plurality of media slices geographically located at the one or more media sources are encoded at different quality levels.

13. The non-transitory computer readable storage medium of claim 12, wherein the media manifest file further identifies another rule that instructs the media player to request the plurality of media slices from a second media source of the one or more media sources at a first quality level when the performance is at or beyond a second performance threshold, and from the second media source at a second quality level when the performance is below the second performance threshold.

14. The non-transitory computer readable storage medium of claim 8, wherein the identifying a geographical location of the client device comprises:
extracting data from the request; and
sending a geographical location request with the extracted data to a location service to determine a geographical region of origin of the client device.

15. A computing system, comprising:
a data storage device; and
a processing device, coupled to the data storage device, to:
receive a request over a network from a media player executing on a client device to adaptively stream media content, wherein the media content comprises a plurality of media slices;
identify a geographical location of the client device from the request;
generate a media manifest file based on the geographical location of the client device, wherein the media manifest file is to indicate one or more media sources at which a copy of the plurality of media slices is geographically located and a charge price associated with delivery of the plurality of media slices from the respective one of the one or more media sources; and
transmit the media manifest file to the client device over the network.

16. The computing system of claim 15, wherein the media manifest file comprises a rule to instruct the media player to request one or more of the plurality of media slices from a first media source of the one or more media sources when a performance of the adaptive streaming is above a performance threshold, wherein the media manifest file is further to identify a first web address where the copy of the plurality of media slices is geographically located at the first media source of the one or more media sources.

17. The computing system of claim 16, wherein the media manifest file is further to identify another rule to instruct the media player to request the one or more of the plurality of media slices from a second media source of the one or more media sources when the performance is at or beyond a second performance threshold, wherein the media manifest file is further to identify a second web address where the copy of the plurality of media slices is geographically located at the second media source of the one or more media sources.

18. The computing system of claim 17, wherein the first web address comprises a first uniform resource locator (URL) that is to identify a first location of the first media source and a second URL that is to identify a second location of the second media source.

19. The computing system of claim 18, wherein the copies of the plurality of media slices geographically located at the one or more media sources are encoded at different quality levels.

20. The computing system of claim 19, wherein the media manifest file is further to identify another rule that instructs the media player to request the plurality of media slices from a second media source of the one or more media sources at a first quality level when the performance is at or beyond a second performance threshold, and from the second media source at a second quality level when the performance is below the second performance threshold.

* * * * *